June 24, 1930. M. A. SMITH 1,766,555
METHOD OF FORMING GLASSWARE
Filed July 11, 1928 2 Sheets-Sheet 1
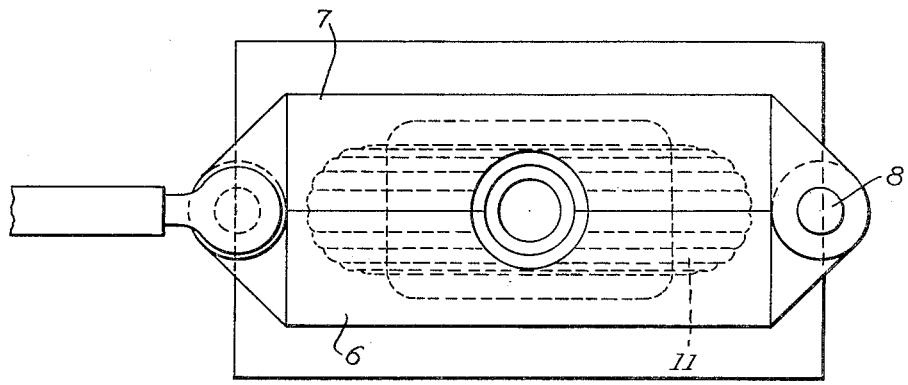
Fig.1.
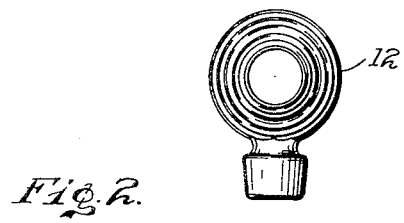
Fig.2.
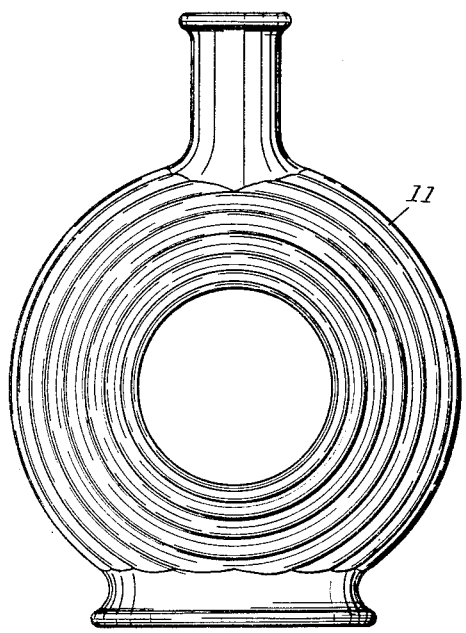
INVENTOR
Maurice A. Smith
By Archworth Martin,
Attorney June 24, 1930. M. A. SMITH 1,766,555
METHOD OF FORMING GLASSWARE
Filed July 11, 1928   2 Sheets-Sheet 2
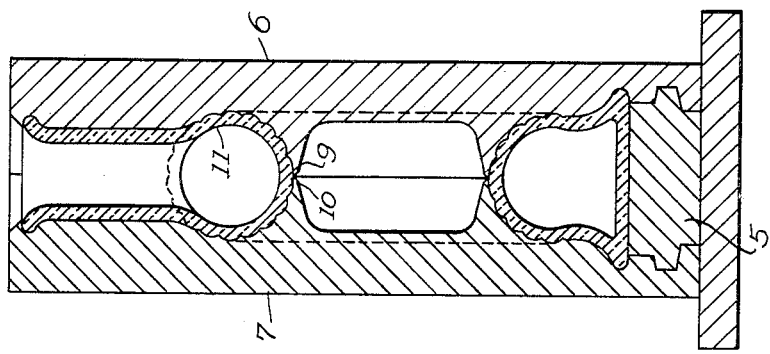
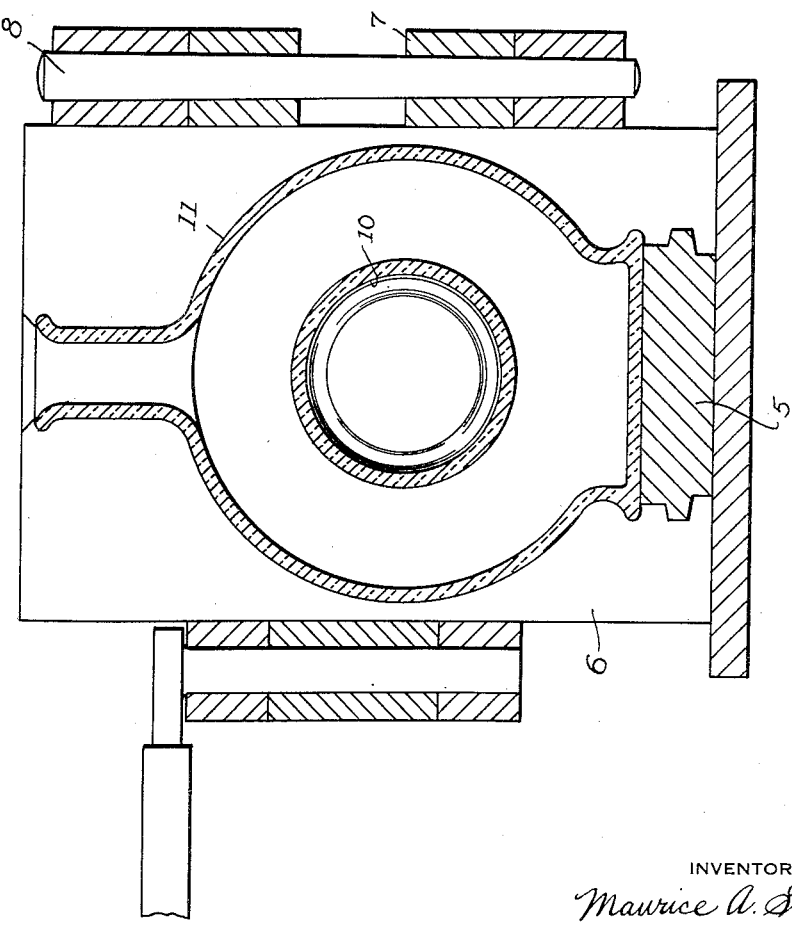
INVENTOR
Maurice A. Smith
By Archworth Martin,
Attorney Patented June 24, 1930

1,766,555

UNITED STATES PATENT OFFICE

MAURICE A. SMITH, OF JEANNETTE, PENNSYLVANIA, ASSIGNOR TO McKEE GLASS COMPANY, OF JEANNETTE, PENNSYLVANIA, A CORPORATION OF PENNSYLVANIA

METHOD OF FORMING GLASSWARE

Application filed July 11, 1928. Serial No. 291,788.

My invention relates to the forming of glassware, and more particularly to the forming of hollow ware in the nature of a glass vessel having an opening therethrough, but it will be understood that the invention is applicable to the making of glass articles of other forms and by methods other than the blowing process.

One object of my invention is to provide an improved means and method whereby articles of glassware or other molded material may be conveniently formed with openings therethrough.

Another object of my invention is to provide an improved manner of forming molded articles of peculiar shape.

One manner in which my invention may be practised is shown in the accompanying drawing, wherein Figure 1 is a plan view of a mold which I employ; Fig. 2 is an elevational view of an article formed in the mold of Fig. 1; Fig. 3 is a vertical sectional view of the mold of Fig. 1, in edge elevation, and Fig. 4 is a side elevational sectional view of the mold.

The mold structure is composed of a bottom mold 5 and side mold members 6 and 7. The side mold members 6 and 7 are hingedly connected by a pin 8 and are provided with locking pins and handles in the usual manner, so that they can be locked in closed position during formation of an article and swung to open position to permit removal of the article.

An important feature of the invention resides in the provision of annular knife-like extensions 9 and 10 on the inner surfaces of the mold walls 6 and 7 respectively, so that when the mold is closed, the knives 9 and 10 abut against one another.

The method of forming an article within the mold is as follows, assuming that the hand method is to be employed: The blower will gather a charge of glass upon his blow pipe out of a glass tank and then shape or block it in somewhat the usual way to effect the desired distribution. He will then flatten the ball or bulb of glass and place it between the mold halves 6 and 7, whereupon these mold sections will be closed and locked, the blower meantime expanding the glass within the mold cavity. When the mold sections 6 and 7 reach completely closed position, their knife-like portions 9 and 10 will have cut through the glass and, owing to the air pressure within the glass body and the compressing action of the mold sides, the cut edges of the glass body will be united or welded together, to form an annular cavity, as shown more clearly in Figs. 2 and 3.

When the glass is cooled sufficiently, the mold is opened and the article 11 removed in the usual manner.

The central portion of the glass body which is cut from the main mass by the knives 9 and 10 will also be removed from the mold and discarded.

A stopper 12 is provided for the bottle 11 but this stopper is independently formed and may be made in a press mold or in any other suitable manner. The stopper is shown as having somewhat the appearance of the bottle, and, if formed by a pressing operation, may be made in a press mold whose sides have knives corresponding to the edges 9 and 10 of the other mold members or whose sides may be simply provided with inwardly-extending bosses to form depressions in the sides of the stopper.

I claim as my invention:—

1. The method of forming hollow glassware which comprises expanding a mass of glass, forcing the central portions of opposite sides of said mass toward one another, cutting away the central parts of said portions and causing the cut edges of the mass of glass to unite.

2. The method of forming glassware which comprises expanding a mass of glass by a blowing action, and cutting out a mid portion at one side of the mass and causing the edges left by the cut-out portion to unite with the remainder of the mass.

In testimony whereof I, the said MAURICE A. SMITH, have hereunto set my hand.

MAURICE A. SMITH.